United States Patent [19]

Mizuno et al.

[11] 4,446,205

[45] May 1, 1984

[54] MAGNETIC RECORDING TAPE HAVING A LEADER TAPE

[75] Inventors: Chiaki Mizuno; Yasuo Tamai; Nobuo Tsuji, all of Kanagawa, Japan

[73] Assignee: Fuji Photo Film Co., Ltd., Kanagawa, Japan

[21] Appl. No.: 447,582

[22] Filed: Dec. 7, 1982

[30] Foreign Application Priority Data

Dec. 7, 1981 [JP] Japan .................... 56-196675

[51] Int. Cl.$^3$ .................... G11B 5/70; B32B 5/16
[52] U.S. Cl. .................... 428/327; 352/235; 428/323; 428/692; 428/694; 428/900; 427/128; 252/62.54; 360/134; 360/135; 360/136
[58] Field of Search .............. 428/922, 900, 327, 323, 428/694, 692; 360/134–136; 352/235; 427/128; 252/62.54

[56] References Cited

U.S. PATENT DOCUMENTS

| | | | |
|---|---|---|---|
| 4,038,453 | 7/1977 | Loran | 428/327 |
| 4,047,232 | 8/1977 | Hisagen | 428/694 |
| 4,146,031 | 8/1979 | Fujiyama | 352/235 |
| 4,397,911 | 8/1983 | Akashi | 428/323 |

*Primary Examiner*—Ellis P. Robinson
*Attorney, Agent, or Firm*—Sughrue, Mion, Zinn, Macpeak, and Seas

[57] ABSTRACT

A leader tape for use in connection with a magnetic recording tape is disclosed. The leader tape is connected to one or both ends of a magnetic recording tape in order to clean components of the recorder such as the head of the recorder in which the tape is used. The leader tape is comprised of a support base having a cleaning layer coated thereon. The cleaning layer is comprised of a binder having dispersed therein an organic thermoplastic high molecular powder having a particle size of 0.1 to 20 μm and an organic thermosetting high molecular powder having a particle size of 0.1 to 10 μm. The leader tape has a light percent transmittence of 20% or more.

11 Claims, No Drawings

MAGNETIC RECORDING TAPE HAVING A LEADER TAPE

FIELD OF THE INVENTION

This invention relates to a magnetic recording tape having a leader tape, and more particularly to a magnetic recording tape having a cleaning leader tape at its end which is capable of cleaning a magnetic head, etc. of a magnetic recording system.

BACKGROUND OF THE INVENTION

A leader tape connected to the end of a magnetic recording tape is used in magnetic recording systems such as audio cassette recorders and video tape recorders to clean stains on heads for recording and reproducing and on guide poles and rollers.

A conventional leader tape has a cleaning layer provided by coating on a support an inorganic pigment dispersed in a binder. Examples of such pigments include alumina ($Al_2O_3$), silicone carbide (SiC), chromium oxide ($Cr_2O_3$), titanium oxide ($TiO_2$), red iron oxide ($\alpha$-$Fe_2O_3$) and silicone oxide ($SiO_2$). Cleaning tapes have superior capacity with respect to removing stains.

However, they have some undesirable features. For example, they can too strongly abrade and often damage a head and a guide pole as well as a blade used for splicing the leader.

It has been proposed in U.S. Pat. No. 3,823,947 that the surface of a support be matted by sand blasting instead of using an abrasive in order to eliminate the above defects. However, an uneven or matted surface of a leader tape is insufficient for obtaining the necessary cleaning effect. Furthermore, the sand blasting can weaken the leader to the extent that its tear strength is insufficient.

Another known leader tape is comprised of a support having provided thereon a cleaning layer containing an inorganic pigment having a particle size of 0.002 to 4 $\mu$m and a binder as described in, for example, Japanese Patent Publication No. 7631/80. This leader tape has a large cleaning effect but the hard inorganic pigment sometimes damages the head when removing stains and the damaged head may also damage the magnetic recording tape, lowering its sensitivity and S/N ratio. When the other side of the leader tape is fixed to a hub with a pin or a nail (in order to wind a magnetic recording tape having the leader tape in an audio or video cassette) the hard inorganic pigment contained in a cleaning layer may cause cuts in the support.

SUMMARY OF THE INVENTION

A primary object of this invention is to provide a magnetic recording tape having a leader tape having an excellent cleaning ability.

Another object of this invention is to provide a magnetic recording tape having a leader tape which does not damage magnetic heads, guide poles or splicing blades.

Yet another object of this invention is to provide a magnetic recording tape having a leader tape which prevents cuts from forming in the leader tape when fixed to a hub.

Still another object of this invention is to provide a magnetic recording tape having a leader tape which can be firmly fixed to the hub.

Another object of this invention is to provide a magnetic recording tape having a leader tape which can retain its cleaning ability even after repeated use.

The above objects of this invention can be achieved by a magnetic recording tape having at the end thereof a leader tape which comprises a support having coated thereon a cleaning layer containing a binder, an organic thermoplastic high molecular powder and an organic thermosetting high molecular powder, and which has a light percent transmittance of not less than 20%.

DETAILED DESCRIPTION OF THE INVENTION

Organic thermoplastic high molecular powders of this invention may be comprised of compounds such as acetylcellulose, polyethylene, polypropylene, polystyrene, thermoplastic polyester, polyamide, polyacrylonitrile and polyacetal resin, with polyethylene, polypropylene and polyamide being preferred. The thermoplastic polymers used in the present invention have generally a melting point of 100° to 260° C., a density of 0.87 to 1.50 g/cm$^3$ and a molecular weight of 10,000 to 200,000, for example, polyethylene having 100°–130° C., 0.88–1.0 g/cm$^3$ and 10,000–100,000, polypropylene having 150°–170° C., 0.87–0.94 g/cm$^3$ and 20,000–150,000 and polyamide having 200°–260° C., 1–1.3 g/cm$^3$ and 10,000–60,000, respectively.

The size of the organic thermoplastic high molecular powders is 0.1 to 20 $\mu$m, more preferably, the maximum size is 10 $\mu$m and the average size is 2.0 to 3.5 $\mu$m. If the size is not larger than 0.1 $\mu$m, satisfactory cleaning ability cannot be obtained. If the size is not smaller than 20 $\mu$m, the difference between a concave and a convex which form uneven surface of a cleaning layer is large and therefore where a magnetic recording tape is wound, the shape of the concave and convex is transferred to the magnetic recording tape, lowering the output level.

Organic thermosetting high molecular powder of this invention includes a phenol resin, a urea resin, a triazine type resin, a melamine resin, an epoxy resin, a furan resin and an acrolein type resin.

The average size of the particles of organic thermosetting high molecular powders is 0.1 to 10 $\mu$m, preferably 0.3 to 3 $\mu$m. If the size is not higher than 0.1 $\mu$m, sufficient cleaning effect cannot be obtained. If the size is not smaller than 10 $\mu$m, the leader tape is easily cut when the leader tape is fixed to a hub.

The weight ratio of thermoplastic high molecular powder to thermosetting high molecular powder is preferably 2/98 to 80/20, more preferably 5/95 to 70/30. If more than 80% of organic thermoplastic high molecular powder is mixed, the leader tape produced from the mixture can be easily released from the hub and its cleaning effect is decreased after repeated use. If more than 98% of organic thermosetting high molecular powder is mixed, the leader tape produced from the mixture can be easily cut off when the leader tape is fixed to a hub.

A binder such as vinyl chloride-vinyl acetate resin, nitrocellulose, vinyl chloride-vinylidene chloride resin, polyuretane resin, water-soluble polymers such as polyvinyl alcohol, polyethylene latex, etc. can be added to the mixture to aid in retaining the mixture of the organic high molecular powders on a support. The mixing weight ratio of the organic high molecular powders to the binder is 1/6 to 3/1, preferably 1/5 to 1/1. With the change of the mixing ratio, light percent transmittance can be changed.

A mixture as described above is coated on a surface, or portions of the surfaces of the support in order to form the desired leader tape.

Where organic high molecular powders are coated in the form of an island having a diameter of 5 to 20 μm and the distance between islands is made 5 to 20 μm, the light percent transmittance can be adjusted by 10 to 30%. That is, light percent transmittance is readily adjusted using organic high molecular powders.

Solvent used for coating should be solvents which are not capable of dissolving the organic high molecular powders, such as a mixture of methyl ethyl ketone and toluene.

A support having a thickness of 5 to 35 μm, a magnetic substance, a binder and other additives such as an antistatic agent generally used can be used in this invention. Specific examples are disclosed in U.S. Pat. No. 4,135,016.

A magnetic recording tape of this invention has a leader tape having the following properties.

(1) The tape can be firmly fixed to a hub.
(2) The tape is not readily cut off when fixed to a hub.
(3) An efficient cleaning effect can be obtained. The cleaning effect is excellent for both stains on the magnetic head, and stains attached to a guide pole, capstan and a pinchroller.
(4) The surface of the magnetic head is not damaged by cleaning.
(5) The cleaning effect is not decreased after repeated use.
(6) Light percent transmittance of a leader tape can readily be adjusted, and can be made high. Accordingly, the tape is suitable for a magnetic recording system which detects the end of the magnetic tape by an electrophototube sensor.

The invention is further explained in more detail by Examples and Comparative Examples. It is easily understood by one skilled in the art that the composition, operation and the order can be changed within the scope of the invention.

EXAMPLE 1

A mixed dispersion of polyethylene powder having an average particle diameter of 2.5 μm (melting point of 116° C., density of 0.95 g/cm$^3$), triazine type resin having an average particle diameter of 1.5 μm (true specific gravity of 1.39, reflactive index of 1.5, no softening point), a copolymer of vinyl chloride and vinyl acetate (molar ratio: 7/3; degree of polymerization: 400) and polyurethan resin was coated on a polyethylene terephthalate support having a thickness of 20 μm in a dry thickness of 8 μm to prepare a coating layer. The tape was slit to a width of 3.8 mm to obtain a cleaning leader tape.

The cleaning leader tape was fixed to a hub and the fixing ability and whether the tape was cut at a hub were checked. At the same time, 1 meter long cleaning leader tape was put in a cassette half and was run in a cassette tape recorder having a magnetic head which had stains beforehand. A check was made on how many times the tape ran until the magnetic head was clean. The less times the tape ran until the stains were removed, the more effectively the cleaning leader tape cleaned. Furthermore a check was made with respect to head damage after the same number of runnings of the tape. The results are shown in Table 1.

TABLE 1

| Sample No. | Polyethylene powder (parts by weight) | Triazine type resin (parts by weight) | Binder (parts by weight) | Fixing ability (g) | Occurrence of tape cut* (%) | Cleaning effect (times of running) | Head damage | Slipping off of coating layer | Light percent transmittance (%) |
|---|---|---|---|---|---|---|---|---|---|
| 1 | 100 | 0 | 300 | 800 | 0 | 3 | absence | absence | 70 |
| 2 | 95 | 5 | " | 900 | " | " | " | " | " |
| 3 | 90 | 10 | " | 900 | " | " | " | " | " |
| 4 | 80 | 20 | " | 1600 | " | " | " | " | " |
| 5 | 70 | 30 | " | 1800 | " | " | " | " | 67 |
| 6 | 50 | 50 | " | more than 1800 | " | 2 | " | " | 65 |
| 7 | 30 | 70 | " | more than 1800 | " | " | " | " | 65 |
| 8 | 20 | 80 | " | more than 1800 | " | " | " | " | 60 |
| 9 | 10 | 90 | " | more than 1800 | " | " | " | " | 60 |
| 10 | 5 | 95 | " | more than 1800 | " | " | " | " | 58 |
| 11 | 3 | 97 | " | more than 1800 | " | " | " | " | 58 |
| 12 | 2 | 98 | " | more than 1800 | 0.1 | " | " | " | 58 |
| 13 | 1 | 99 | " | more than 1800 | 4.3 | " | " | " | 58 |
| 14 | 0 | 100 | " | more than 1800 | 10 | " | " | " | 58 |

*Occurrence of whether the tape is cut when fixed to the hub is represented by %.

When more than 80% of polyethylene powder as a thermoplastic high molecular powder was mixed, the fixing ability is decreased. When more than 98% of triazine type resin powder as a thermosetting high molecular powder was mixed, the occurrence of tape cut (%) markedly increased.

EXAMPLE 2

The same procedure as in Example 1 was repeated except that triazine type resin powder was used as an organic thermosetting high molecular powder and those powders (average particle diameter: 2.5 μm) as shown in Table 2 were used as an organic thermoplastic high molecular powder. The dry thickness of the cleaning layer was 8 μm and the mixing weight ratio of the organic thermoplastic high molecular powder and the organic thermosetting high molecular powder was 10/90. The results are shown in Table 2.

high molecular powder was 10/90. The results are shown in Table 3.

TABLE 2

| Sample No. | Organic thermoplastic high molecular powder | Fixing ability (g) | Occurrence of tape cut* (%) | Cleaning effect (times of running) | Head damage | Slipping off of coating layer | Light percent trans- mittance (%) |
| --- | --- | --- | --- | --- | --- | --- | --- |
| 15 | Acetylcellulose | more than 1800 | 0 | 2 | absence | absence | 53 |
| 16 | Polypropylene | more than 1800 | " | " | " | " | 63 |
| 17 | Polyamide | more than 1800 | " | " | " | " | 65 |
| 18 | Polystyrene | more than 1800 | 0.2 | " | " | " | 60 |
| 19 | Thermoplastic polyester | more than 1800 | 0.1 | " | " | " | 58 |
| 20 | Polyacrylonitrile | more than 1800 | 0 | " | " | " | 65 |
| 21 | Polyacetal | more than 1800 | 0.1 | " | " | " | 53 |

*See Table 1

TABLE 3

| Sample No. | Organic thermosetting high molecular powder | Fixing ability (g) | Occurrence of tape cut* (%) | Cleaning effect (times of running) | Head damage | Slipping off of coating layer | Light percent trans- mittance (%) |
| --- | --- | --- | --- | --- | --- | --- | --- |
| 22 | Urea resin | more than 1800 | 0 | 2 | absence | absence | 52 |
| 23 | Phenol resin | more than 1800 | " | " | " | " | 58 |
| 24 | Melamine resin | more than 1800 | " | " | " | " | 60 |
| 25 | Epoxy resin | more than 1800 | " | 3 | " | nearly absent | 60 |
| 26 | Furan resin | more than 1800 | " | " | " | nearly absent | 60 |
| 27 | Acrolein resin | more than 1800 | " | " | " | nearly absent | 58 |

*See Table 1

These fixing abilities, occurrences of tape cut and cleaning effects were excellent and were not changed even though the types of the organic thermoplastic high molecular powder were changed.

EXAMPLE 3

The same procedure as in Example 1 was repeated except that a polyethylene powder was used as an organic thermoplastic high molecular powder and those powders (average particle diameter: 1.5 μm) as shown in Table 3 were used as an organic thermosetting high molecular powder.

The dry thickness of the cleaning layer was 8 μm, and the mixing weight ratio of the organic thermoplastic high molecular powder to the organic thermosetting It was found that these fixing abilities, occurrences of tape cut and cleaning effects were excellent and were not changed even though the types of the organic thermosetting high molecular powder were changed.

EXAMPLE 4

The same procedure as in Example 1 was repeated except that the mixing weight ratio of the mixture of the organic high molecular powders and the binder were changed as shown in Table 4. The dry thickness of cleaning tape was 8 μm. Polyethylene powder is used as an organic thermoplastic high molecular powder and triazine type resin was used as an organic thermosetting high molecular powder and the mixing ratio thereof were 10/90. The results are shown in Table 4.

TABLE 4

| Sample No. | Mixture of high molecular powders (parts by weight) | Binder (parts by weight) | Fixing ability (g) | Occurrence of tape cut* (%) | Cleaning effect (times of running) | Head damage | Slipping off of coating layer | Light percent trans- mittance (%) |
| --- | --- | --- | --- | --- | --- | --- | --- | --- |
| 28 | 100 | 30 | more than 1800 | 2.5 | 2 | absence | a little | 20 |
| 29 | 100 | 50 | more than 1800 | 0.1 | " | " | nearly absent | 35 |
| 30 | 100 | 100 | more than 1800 | 0 | " | " | nearly absent | 45 |
| 31 | 100 | 200 | more than 1800 | " | " | " | absence | 53 |
| 32 | 100 | 300 | more than 1800 | " | " | " | " | 60 |

TABLE 4-continued

| Sample No. | Mixture of high molecular powders (parts by weight) | Binder (parts by weight) | Fixing ability (g) | Occurrence of tape cut* (%) | Cleaning effect (times of running) | Head damage | Slipping off of coating layer | Light percent transmittance (%) |
|---|---|---|---|---|---|---|---|---|
| 33 | 100 | 500 | more than 1800 | " | 3 | " | " | 65 |
| 34 | 100 | 600 | more than 1800 | " | 4 | " | " | 75 |
| 35 | 100 | 700 | more than 1800 | " | 5 | " | " | 83 |

*See Table 1

It is found that when 30 or less parts by weight of a binder was used per 100 parts by weight of a mixture of high molecular powders, occurrence of tape cut was high and slipping off of coating layer took place. When 600 or more parts by weight of binder was used, the cleaning effect was decreased.

EXAMPLE 5

Sample No. 9 in Example 1 was compared with the following comparative sample and the results are shown in Table 5.

Comparative Sample

The same procedure as in Example 1 was repeated except that titanium oxide ($TiO_2$) having an average particle size of 0.3 μm was used in place of the mixture of the organic high molecular powders to obtain a leader tape.

Two types of the leader tapes were connected to cassette recording tapes respectively and these tapes were run the same number of times in an audio cassette recorder to see whether the head was damaged. The leader tape 30 meter long was put in a cassette and run 50 times back and forth and the degree of abrasion of the magnetic head was checked. The magnetic head used here was made of soft permalloy. Further, these two types of leader tapes were fixed to a hub and the fixing ability and the occurrence of tape cut were checked respectively.

TABLE 5

| Sample No. | Fixing ability (g) | Occurrence of tape cut* (%) | Head damage | Degree of head abrasion |
|---|---|---|---|---|
| No. 9 in Ex. 1 | more than 1800 | 0 | absence | 1.0μ |
| Comparative Sample (inorganic pigment) | more than 1800 | 30 | a little | 23μ |

*See Table 1

EXAMPLE 6

A mixed dispersion of polyethylene powder having an average particle diameter of 2.5 μm (melting point of 116° C., density of 0.95 g/cm³), triazine type resin having an average particle diameter of 1.5 μm (true specific gravity of 1.39, reflective index of 1.5, no softening point), a copolymer of vinyl chloride and vinyl acetate (molar ratio: 7/3; a degree of polymerization: 400) and polyurethan resin was coated on a polyethylene terephthalate support having a thickness of 20 μm in a dry thickness of 8 μm to prepare a coating layer. Then, an alcohol solution or aqueous solution of the antistatic agents shown in Table 6 was coated on the uneven surface of coating layer or a base surface of the coated tape thus obtained.

The charging property of the tapes after being rubbed with a cotton cloth were checked and the results are shown below.

TABLE 6

| Sample No. | Antistatic agent | Surface coated by antistatic agent | Amount of antistatic agent | Charging property* |
|---|---|---|---|---|
| 36 | None | — | — | 8.5 cm |
| 37 | Fatty acid amine quaternary ammonium salt type (Ehucol -72) | uneven surface | 50 mg/m² | 0.5 cm |
| 38 | Fatty acid amine quaternary ammonium salt type (Ehucol -72) | base surface | 50 mg/m² | 1.0 cm |
| 39 | Alkyl phosphate type (PMX-3001) | uneven surface | 50 mg/m² | 0.5 cm |
| 40 | Alkyl phosphate type (PMX-3001) | base surface | 50 mg/m² | 1.0 cm |
| 41 | Polyoxyethylene alkylamine type (Tenro A-40) | uneven surface | 50 mg/m² | 1.0 cm |
| 42 | Polyoxyethylene alkylamine type (Tenro A-40) | base surface | 50 mg/m² | 1.5 cm |

*Charging property expressed in terms of the maximum distance at which the rubbed tape can attract ashes of cigarette.

While the invention has been described in detail and with reference to specific embodiments thereof, it will be apparent to one skilled in the art that various changes and modifications can be made therein without departing from the spirit and scope thereof.

What is claimed is:

1. A leader tape, comprising:
   a support base; and
   a cleaning layer coated on a surface of the support base, cleaning layer comprising a binder having dispersed therein an organic thermoplastic high molecular powder having a particle size of 0.1 to 20 μm and an organic thermosetting high molecular powder having a particle size of 0.1 to 10 μm, the leader tape having a light percent transmittance of 20% or more.

2. A leader tape as claimed in claim 1, wherein the thermoplastic high molecular powder has a maximum particle size of 10 μm and average size of between 2.0 to 3.5 μm.

3. A leader tape as claimed in claim 1, wherein the thermosetting high molecular powder has a particle size of 0.3 to 3 μm.

4. A leader tape as claimed in claim 1, wherein the weight ratio of the thermoplastic high molecular powder to the thermosetting high molecular powder is 2/98 to 80/20.

5. A leader tape as claimed in claim 4, wherein the weight ratio of the thermoplastic high molecular powder to the thermosetting high molecular powder is 5/95 to 70/30.

6. A leader tape as claimed in claim 1, wherein the weight ratio of the combined amount of the organic thermoplastic high molecular powder and the organic thermosetting high molecular powder to the binder is 1/6 to 3/1.

7. A leader tape as claimed in claim 6, wherein the weight ratio of the combineded amount of the high molecular powders to the binder is 1/5 to 1/1.

8. A leader tape as claimed in claim 1, wherein the thermoplastic high molecular weight powder is comprised of a polymer selected from the group consisting of acetylcellulose, polyethylene, polypropylene, polystyrene, thermoplastic polyester, polyamide, polyacrylonitrile and polyacetal resin.

9. A leader tape as claimed in claim 8, wherein the polymer is polyethylene, polypropylene or polyamide.

10. A leader tape as claimed in claim 1, wherein the thermosetting high molecular weight powder is comprised of a polymer selected from the group consisting of phenol resin, urea resin, triazine type resin, melamine resin, epoxy resin, furan resin and acrolein type resin.

11. A magnetic recording tape having a leader tape at its end, the leader tape comprising a support base having on a surface thereof a cleaning layer comprising a binder having dispersed therein an organic thermoplastic high molecular powder having a particle size of 0.1 to 20 μm and an organic thermosetting high molecular powder having a particle size of 0.1 to 10 μm, the leader tape having a light percent transmittance of 20% or more.

* * * * *